United States Patent
Kim

(10) Patent No.: US 11,257,461 B2
(45) Date of Patent: Feb. 22, 2022

(54) DIGITAL SIGNAGE AND CONTROL METHOD THEREOF

(71) Applicant: LG ELECTRONICS INC., Seoul (KR)

(72) Inventor: Youngjin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 52 days.

(21) Appl. No.: 16/468,660

(22) PCT Filed: Mar. 6, 2017

(86) PCT No.: PCT/KR2017/002389
§ 371 (c)(1),
(2) Date: Jun. 11, 2019

(87) PCT Pub. No.: WO2018/110772
PCT Pub. Date: Jun. 21, 2018

(65) Prior Publication Data
US 2019/0333472 A1    Oct. 31, 2019

(30) Foreign Application Priority Data

Dec. 15, 2016 (KR) .......................... 10-2016-0172040

(51) Int. Cl.
*G09G 5/02* (2006.01)
*G09F 9/30* (2006.01)
*G09F 27/00* (2006.01)

(52) U.S. Cl.
CPC ................. *G09G 5/02* (2013.01); *G09F 9/30* (2013.01); *G09F 27/005* (2013.01);
(Continued)

(58) Field of Classification Search
None
See application file for complete search history.

(56) References Cited

U.S. PATENT DOCUMENTS

2005/0195280 A1* 9/2005 Murakami ............. G09G 3/007
348/173
2011/0001764 A1* 1/2011 Rhodes .................. G09G 3/344
345/690
(Continued)

FOREIGN PATENT DOCUMENTS

KR    10-2004-0063567    7/2004
KR    10-2008-0042997    5/2008
(Continued)

OTHER PUBLICATIONS

PCT International Application No. PCT/KR2017/002389, International Search Report dated Sep. 15, 2017, 2 pages.

*Primary Examiner* — Aaron M Richer
(74) *Attorney, Agent, or Firm* — Lee, Hong, Degerman, Kang & Waimey PC

(57) ABSTRACT

Digital signage according to an embodiment of the present invention includes: a display unit; a human body sensing sensor unit; and a control unit which controls the operation of the digital signage, wherein the human body sensing sensor unit senses a motion of a human body and the distance between the human body and the digital signage, and the control unit can control so as to divide a frame buffer of content according to a predetermined set value, and to change an arbitrary pixel in a region of the divided frame buffer to black.

12 Claims, 16 Drawing Sheets

(52) U.S. Cl.
CPC .............. *G09F 2027/001* (2013.01); *G09G 2320/0257* (2013.01); *G09G 2320/0666* (2013.01); *G09G 2354/00* (2013.01); *G09G 2360/18* (2013.01)

(56) References Cited

U.S. PATENT DOCUMENTS

| | | | | |
|---|---|---|---|---|
| 2011/0273482 | A1* | 11/2011 | Massart | G09G 3/20 345/690 |
| 2013/0088528 | A1* | 4/2013 | Borgers | G09G 3/3648 345/690 |
| 2014/0354531 | A1* | 12/2014 | Foreman | G06F 3/0482 345/156 |
| 2015/0009107 | A1 | 1/2015 | Park et al. | |
| 2016/0203754 | A1* | 7/2016 | Lee | G09G 5/003 345/214 |
| 2017/0117859 | A1* | 4/2017 | Aina | H03F 3/211 |
| 2017/0287391 | A1* | 10/2017 | Zhuang | G06F 13/14 |

FOREIGN PATENT DOCUMENTS

| | | |
|---|---|---|
| KR | 10-1211121 | 12/2012 |
| KR | 10-2016-0025143 | 3/2016 |

* cited by examiner

FIG. 12
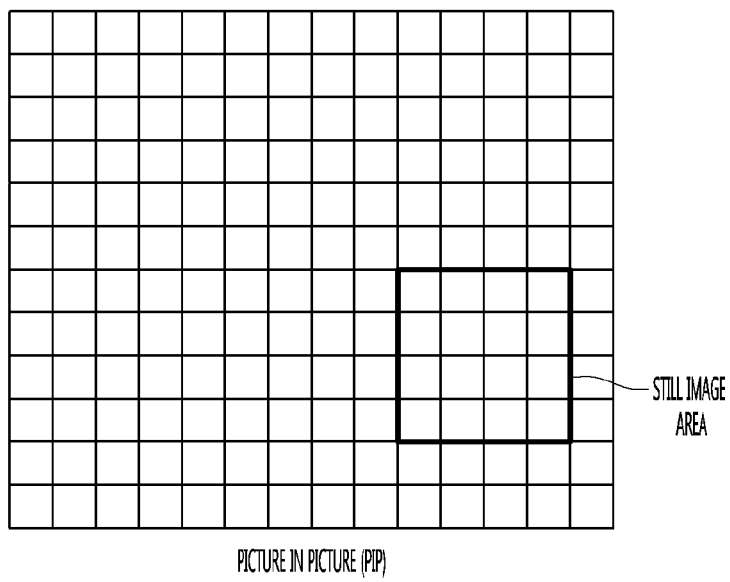
PICTURE IN PICTURE (PIP)
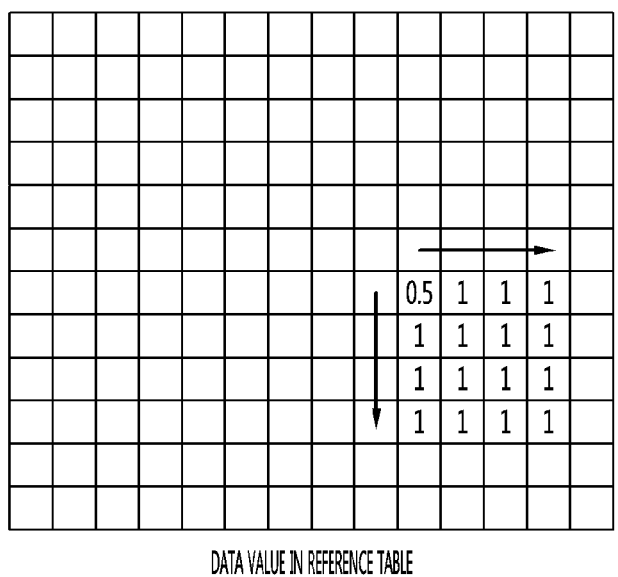
DATA VALUE IN REFERENCE TABLE FIG. 18
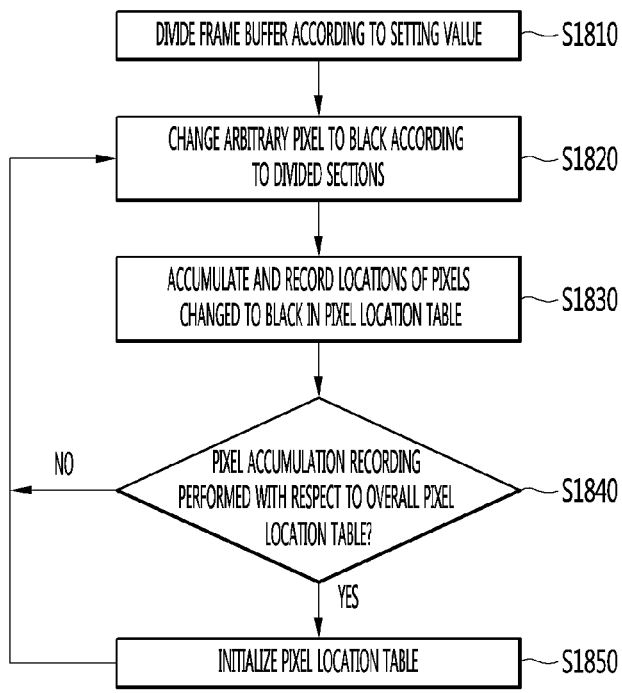
FIG. 19
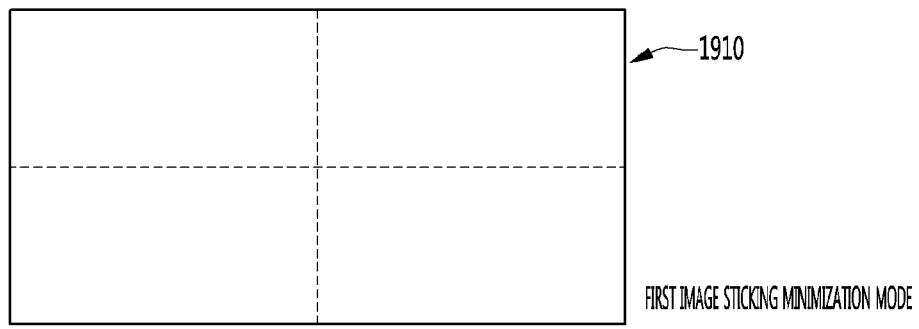
FIRST IMAGE STICKING MINIMIZATION MODE
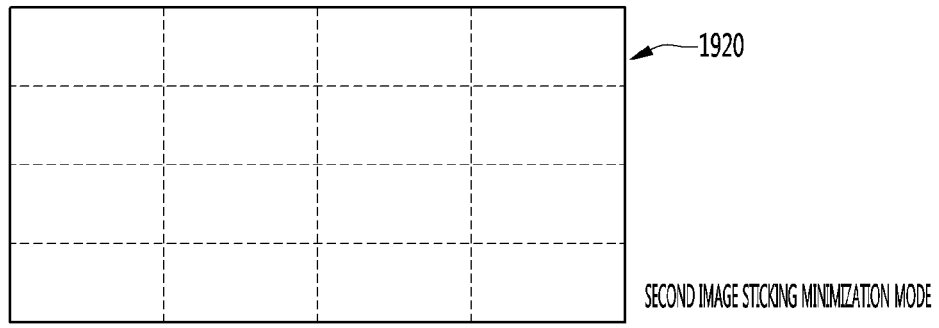
SECOND IMAGE STICKING MINIMIZATION MODE

DIGITAL SIGNAGE AND CONTROL METHOD THEREOF

CROSS-REFERENCE TO RELATED APPLICATIONS

This application is the National Stage filing under 35 U.S.C. 371 of International Application No. PCT/KR2017/002389, filed on Mar. 6, 2017, which claims the benefit of earlier filing date and right of priority to Korean Application No. 10-2016-0172040, filed on Dec. 15, 2016, the contents of which are all hereby incorporated by reference herein in their entirety.

TECHNICAL FIELD

The present invention relates to a digital signage and, more particularly, to a method of controlling a digital signage for minimizing image sticking which may occur in the digital signage.

BACKGROUND ART

In a conventional advertisement method, generally, flyers, on which advertisement content is posted, are provided offline or is provided through the Internet, a TV or a radio online. However, such a conventional advertisement method provides fixed information to users unilaterally. In addition, since the owner and the creator of advertisement content are different, it is not easy to rapidly modify, change or update previously created advertisement content. Therefore, incorrect information may be transmitted to the users, thereby causing misunderstanding between the users and the advertiser.

Meanwhile, a display device may be used to output advertisement content in places used by a lot of persons at the same time, such as marts or airports. However, even in this case, previously created advertisement content is repeatedly reproduced and user's access to information is still limited.

Meanwhile, a digital signage is installed in public places to perform display for a long time.

In addition, a static image such as product advertisement or scheduling information of a company is mostly displayed on the digital signage.

As described above, as the static image is displayed on the digital signage for a long time, an image sticking phenomenon occurs, thereby causing dissatisfaction of consumers.

DISCLOSURE

Technical Problem

In an embodiment of the present invention, it is possible to minimize an image sticking phenomenon which may occur when a static image is displayed for a long time and to improve satisfaction of consumers.

In an embodiment of the present invention, it is possible to minimize an image sticking phenomenon, by displaying a predetermined internal pattern without being recognized by a user.

Another object of the present invention devised to solve the problem lies in a display device having an automatic image sticking minimization function for automatically minimizing image sticking without user settings at a level that does not lower image quality, and an image sticking minimization method thereof.

Technical Solution

A digital signage according to an embodiment of the present invention includes a display, a human body detection sensor, and a controller configured to control operation of the digital signage. The human body detection sensor detects motion of a human body and a distance between the digital signage and the human body.

The controller performs control to divide a frame buffer of content according to a predetermined setting value and to change an arbitrary pixel of divided areas of the frame buffer to black.

The controller of the digital signage according to the embodiment of the present invention performs an image sticking minimization mode varying according to the distance between the digital signage and the human body detected by the human body detection sensor, and the predetermined setting value is determined according to the image sticking minimization mode.

In the digital signage according to the embodiment of the present invention, when the distance between the digital signage and the human body is within a predetermined first range, the controller performs a first image sticking minimization mode, and divides the frame buffer into four areas according to the first image sticking minimization mode.

In the digital signage according to the embodiment of the present invention, when the distance between the digital signage and the human body is within a predetermined second range, the controller performs a second image sticking minimization mode, and divides the frame buffer into nine areas according to the second image sticking minimization mode.

In the digital signage according to the embodiment of the present invention, when the distance between the digital signage and the human body is within a predetermined third range, the controller performs a third image sticking minimization mode, and divides the frame buffer into 16 areas according to the third image sticking minimization mode.

The controller of the digital signage according to the embodiment of the present invention performs control to record and store locations of pixels changed to black in the areas of the frame buffer divided according to the predetermined setting value in a pixel location table. The controller of the digital signage according to the embodiment of the present invention selects a target pixel changed to black within the divided areas for each frame of the content until all pixels in the divided areas are changed to black once.

The human body detection sensor of the digital signage according to the embodiment of the present invention includes a PIR sensor configured to detect a human body, an operational amplifier (OpAmp) configured to amplify a detected signal, and a comparator configured to compare amplified signals and to output a digital value.

In the digital signage according to the embodiment of the present invention, the operational amplifier is controlled by a digital register, and the human body detection sensor detects the distance between the digital signage and the human body using the digital register.

In the digital signage according to the embodiment of the present invention, when the distance between the digital signage and the human body is in a predetermined fourth range, the controller sets an image sticking minimization mode to off.

Advantageous Effects

The present invention has the following effects.

According to one of various embodiments of the present invention, since a fixed image is displayed for a long time without interrupting the user's watching of an image, it is possible to minimize image sticking, to enhance durability of a display device and to minimize consumer dissatisfaction.

According to another embodiment of the present invention, even if a user does not perform any operation, image sticking correction is automatically performed only in the case of a still image. In particular, when advertisement and information is transmitted, since image sticking correction is possible without a separate administrator, user convenience can increase.

DESCRIPTION OF DRAWINGS

FIGS. 11 to 13 are views illustrating an image sticking minimization operation according to an image area.

FIGS. 18 to 20 are views illustrating a method of minimizing image sticking in a digital signage according to another embodiment of the present invention in detail.

BEST MODE

Figure 1:
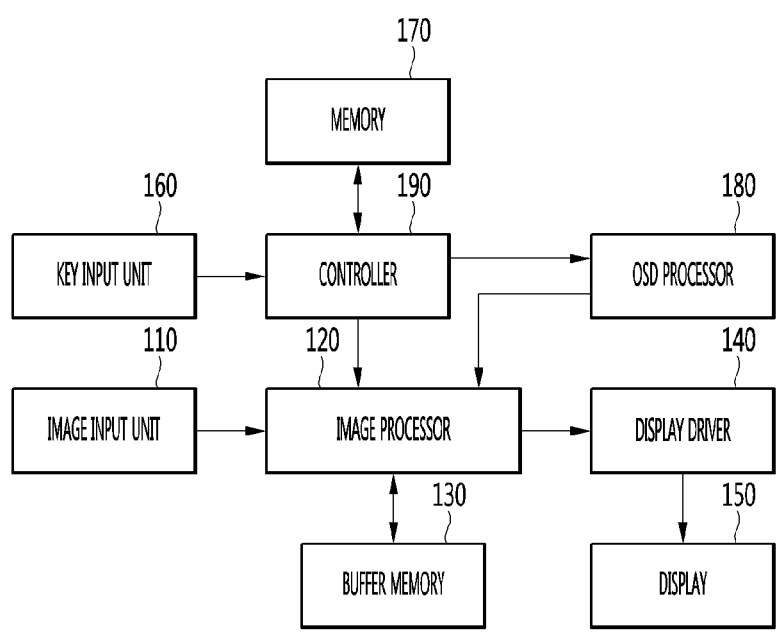
FIG. 1 is a block diagram showing a digital signage according to the present invention.

Hereinafter, a digital signage system and a control method thereof according to an embodiment of the present invention will be described in detail with reference to the accompanying drawings. The accompanying drawings that illustrate an exemplary embodiment of the present invention, which are provided to explain in detail the present invention, and it should be understood that the scope of the present invention is not limited by the accompanying drawings.

In addition, the same or corresponding components are denoted by the same reference numbers in the accompanying drawings, and redundant description thereof will be omitted. For convenience of explanation, the size and shape of each constituent member shown may be exaggerated or reduced.

Meanwhile, it will be understood that, although the terms first, second, etc. may be used herein to describe various elements of the present invention, these terms are only used to distinguish one element from another element and essential, order, or sequence of corresponding elements are not limited by these terms.

The suffixes "module" and "unit" of elements herein are used for convenience of description and thus can be used interchangeably.

Although the terms used in the present invention are selected from generally known and used terms, terms used herein may be variable depending on operator's intention or customs in the art, appearance of a new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

For example, in the present invention, a "digital signage" described in this specification refers to a display advertisement board for transmitting information advertisements through various IT technologies such as hardware, software, content, networks. Such a digital signage may be installed and operated in large buildings having a large floating population, such as terminals, government places, bus stops, department stores, subways, airports, or hospitals or places where people stay for a certain time, such as offices, elevators, theaters, restaurants, shopping malls or stores.

A stand-alone digital signage may include a signboard or a billboard composed of a digital information display such as a plasma display panel (PDP), a liquid crystal display (LCD) or a light emitting diode and store and manually reproduce pre-created information and advertisement content in a memory, and a network type digital signage may transmit information and advertisement content to a digital information display through a communication network and perform transmission of content from a center and state management of a device. Such a digital signage is an example of a display device. Hereinafter, in some cases, the digital signage and the display device may be used interchangeably.

Such a digital signage is, for example, an intelligent network TV capable of supporting at least one of a broadcast reception function, a computer supporting function and an Internet function, and may include various interfaces such as a handwriting type input device, a touchscreen or a pointing device. Such a display device may support a wired or wireless network to be connected to the Internet and/or another digital device and perform e-mail, web-browsing, banking, or gaming function. Meanwhile, the display device may use the standardized general-purpose OS in order to perform or support the above-described functions. Accordingly, the display device may perform user-friendly functions on the general-purpose OS kernel, by freely adding or deleting various applications.

In addition, a mobile device described in this specification is, for example, a portable communication device, a portable computer or a portable terminal and may have a display screen, a touch input unit and/or a small keyboard and include an easy-to-use interface. In addition, such a mobile terminal may be connected to the Internet and another digital device through a wireless Internet function to perform an e-mail, web-browsing, banking, or gaming function, similarly to the digital signage, and may use the standardized general-purpose OS.

Hereinafter, various embodiments of the present invention will be described in detail with reference to the accompanying drawings.

However, the embodiments are to help the full understanding of the present invention and the scope of the present invention are not limited thereto.

Figure 2:
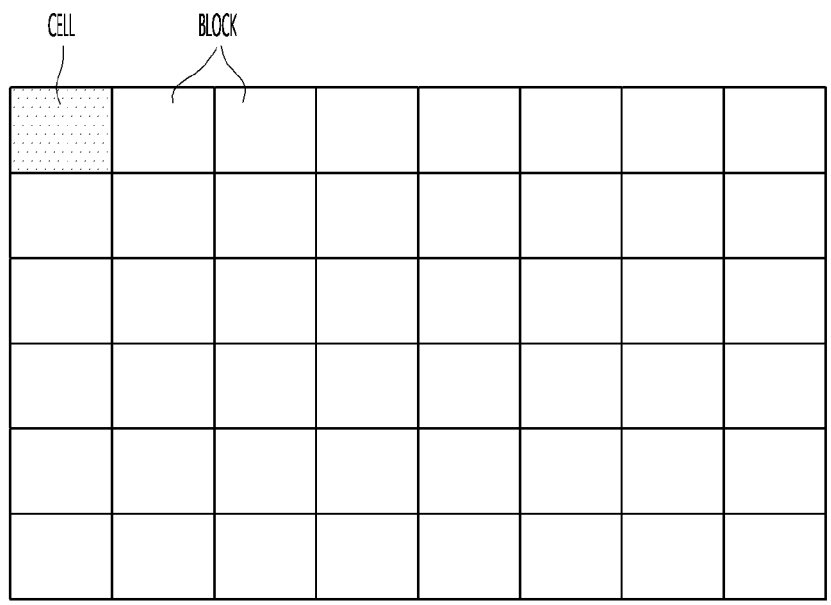
FIG. 2 is a view showing an example of a plurality of virtual display blocks for screen image sticking minimization in a digital signage according to the present invention.
Figure 3:
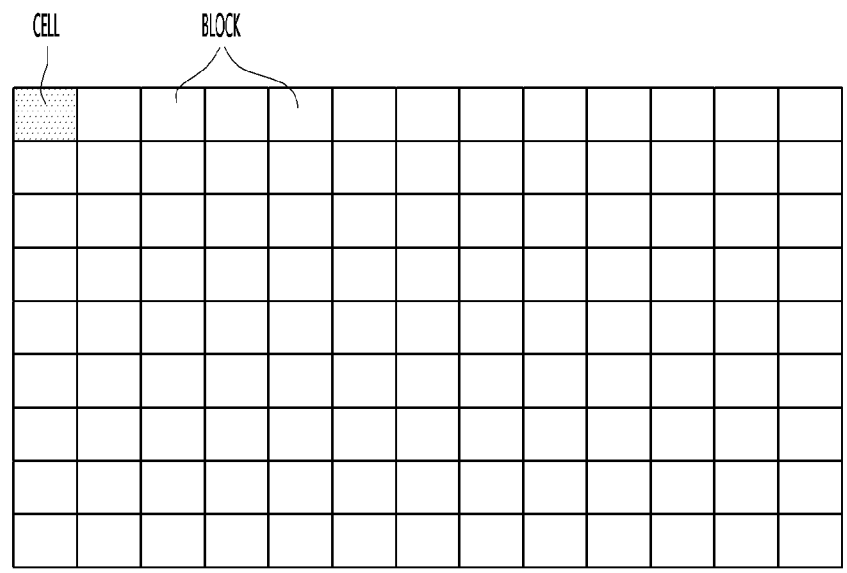
FIG. 3 is a view showing an example of a plurality of virtual display blocks for screen image sticking minimization in a digital signage according to the present invention.

FIG. 1 is a block diagram showing a digital signage according to the present invention, FIG. 2 is a view showing an example of a plurality of virtual display blocks for screen image sticking minimization in a digital signage according to the present invention, and FIG. 3 is a view showing an example of a plurality of virtual display blocks for screen image sticking minimization in a digital signage according to the present invention.

The digital signage according to the present invention includes an image input unit 110, an image processor 120, a buffer memory 130, a display driver 140, a display 150, a key input unit 160, a memory 170, an OSD processor 180 and a controller 190.

The image input unit 110 receives an image signal R, G and B and performs digital image signal processing (digital R, G and B).

The buffer memory 130 stores an image output from the image input unit 110 in frame units.

The image processor 120 stores an image signal output from the image input unit 110 in the buffer memory 130 and then performs image processing (scaling, etc.) suitable for the format of the display 180 with respect to the image signal.

The display driver 140 receives an image signal output from the image processor 120 and output a driving signal to drive the display 150.

The display 150 displays an image according to the driving signal of the display driver 140.

The key input unit 160 receives a request command of a user and may include a remote controller, a mouse, a keyboard, a keypad, etc.

The memory 170 stores data for overall operation, data for screen image-sticking minimization, and a user request command input through the key input unit 160.

The data for screen image-sticking minimization includes the number of block units in which the display 150 is divided into the number of virtual display blocks and an optimal brightness control command (data) for each cell in each block unit.

In other words, the brightness control data refers to data for changing a voltage applied to each cell at least one time within a time when image sticking or deterioration occurs according to a still image time for each cell within the block unit.

The OSD processor 180 performs processing for displaying an internal menu for screen image sticking minimization on the display 150.

The controller 190 controls the overall digital signage and performs brightness control with respect to the cell (pixel) within the block unit set with respect to the display 150 in order to minimize image sticking when a still image is displayed for a time set in the display 150 or more.

In the digital signage according to the present invention, the display is divided into a plurality of virtual display blocks and the brightness of a cell is controlled in units of the divided blocks, for screen image-sticking minimization.

To this end, the display 150 is divided into a plurality of blocks in the form of a matrix as shown in FIG. 2 or 3 and the brightness of the plurality of cells within each block unit is sequentially made lower or higher than normal brightness in units of a time set for at least one pixel, thereby minimizing the image sticking on the screen.

To this end, the voltage applied to the cell may be turned off by controlling the intensity of the voltage applied to the cell.

Here, an off time or a time when a low (or high) voltage is applied may be proportional to the size of an LCD module or a PDP module configuring the display and the number of blocks.

In addition, the size of the module and the number of blocks may proportionally increase and a voltage applied to all cells within one block may be changed (decreased, increased or turned off) during a still image time or less when image sticking may occur in the cell within one block unit according to field test.

Figure 4:
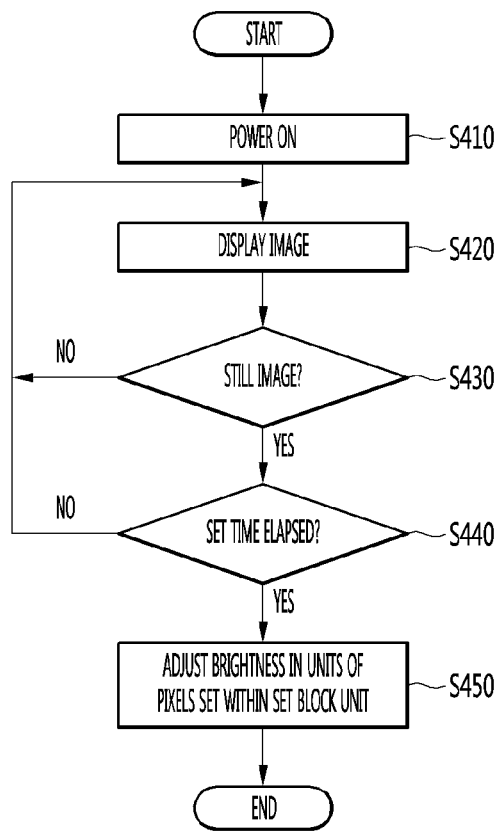
FIG. 4 is a flowchart illustrating an image sticking minimization method of a digital signage according to a first embodiment of the present invention.

FIG. 4 is a flowchart illustrating an image sticking minimization method of a digital signage according to a first embodiment of the present invention.

In an image sticking minimization method of a digital signage according to a first embodiment of the present invention, when the digital signage is powered on (S410), an image may be displayed (S420). Then, a controller 430 may determine whether a still image is displayed (S430). Upon determining that the still image is displayed (S430), whether a predetermined time has elapsed may be determined (S440). Upon determining that a time when the still image is displayed exceeds the predetermined time (S440), the display may be divided into a plurality of virtual display blocks and brightness may be adjusted in units of pixels set within a set block unit (S450). At this time, as described above, the voltage applied to at least one pixel is changed (decreased, increased or turned off). At this time, the applied voltage is changed at least once within a time when image sticking or deterioration may occur according to the still image time with respect to all cells within the block unit.

Figure 5:
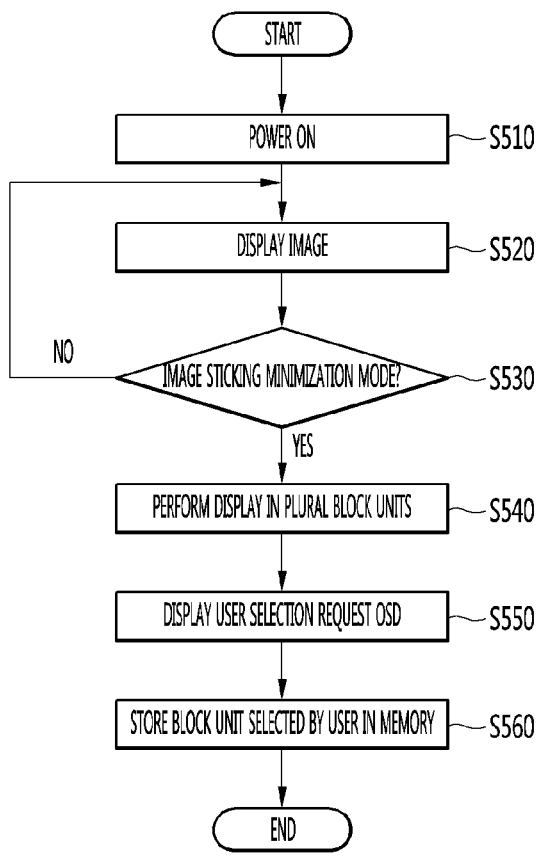
FIG. 5 is a flowchart illustrating a block setting method for image sticking minimization of a digital signage according to the present invention.

FIG. 5 is a flowchart illustrating a block setting method for image sticking minimization of a digital signage according to the present invention.

A block setting method for image sticking minimization according to the present invention is to differently set a block size according to users when the voltage of the individual cell in the block unit for image sticking minimization of the present invention is changed.

To this end, whether an image sticking minimization mode is selected may be determined (S530) when power is turned on (S510) and when an image is displayed (S520). Upon determining that the image sticking minimization mode is selected (S530), a plurality of vertical and horizontal lines having a matrix shape for dividing the display are displayed and virtual display blocks obtained by dividing the display into the plurality of blocks are displayed (S540). At this time, as shown in FIG. 2 or 3, the block units according to the horizontal and vertical lines are displayed in the OSD form.

Subsequently, a user selection request OSD for enabling user selection may be displayed (S550). Then, the block unit selected by the user may be stored in the memory (S560).

Figure 6:
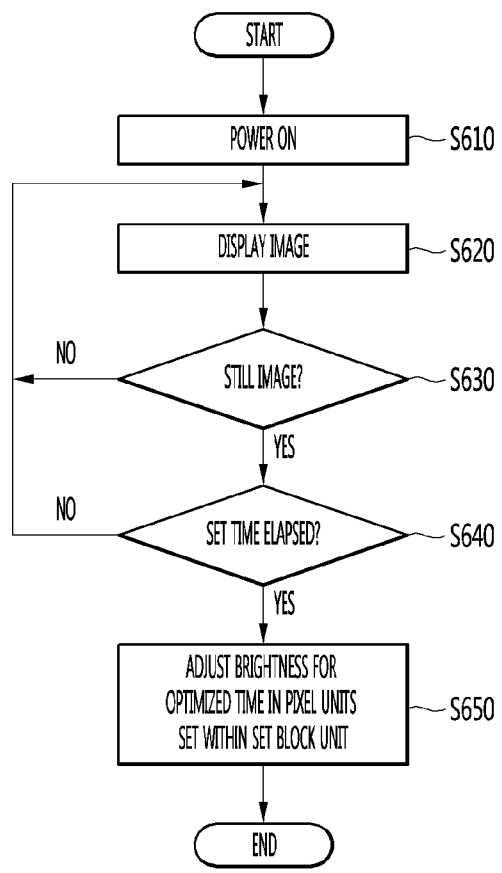
FIG. 6 is a flowchart illustrating an image sticking minimization method of a digital signage according to a second embodiment of the present invention.

FIG. 6 is a flowchart illustrating an image sticking minimization method of a digital signage according to a second embodiment of the present invention.

In an image sticking minimization method of a digital signage according to a second embodiment of the present invention, when the digital signage is powered on (S610), an image may be displayed (S620). Then, a controller 130 may determine whether a still image is displayed (S630). Upon determining that the still image is displayed (S630), whether a predetermined time has elapsed may be determined (S640). Upon determining that a time when the still image is displayed exceeds the predetermined time (S640), brightness may be adjusted for an optimized time in pixel units set within a set block unit (S650). Here, the optimized time is to change the voltage applied to the cell at least once within a time when image sticking or deterioration may occur according to the still image time with respect to all cells within the block unit.

Figure 7:
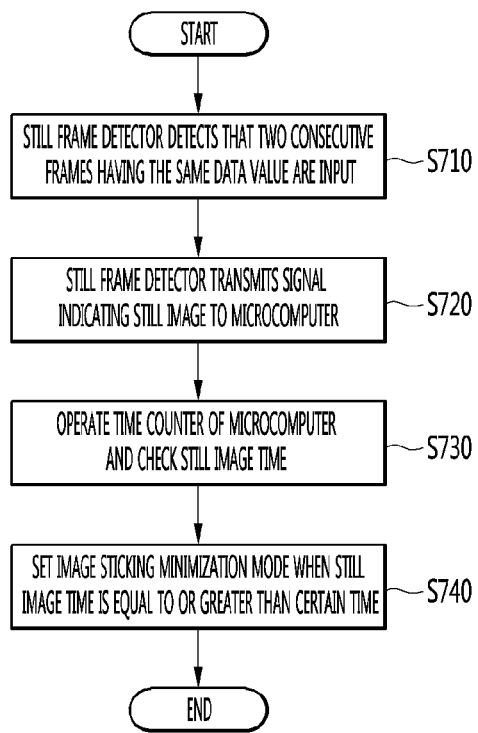
FIGS. 7 to 9 are flowcharts illustrating a control method for minimizing image sticking in a digital signage according to another embodiment of the present invention.
Figure 8:
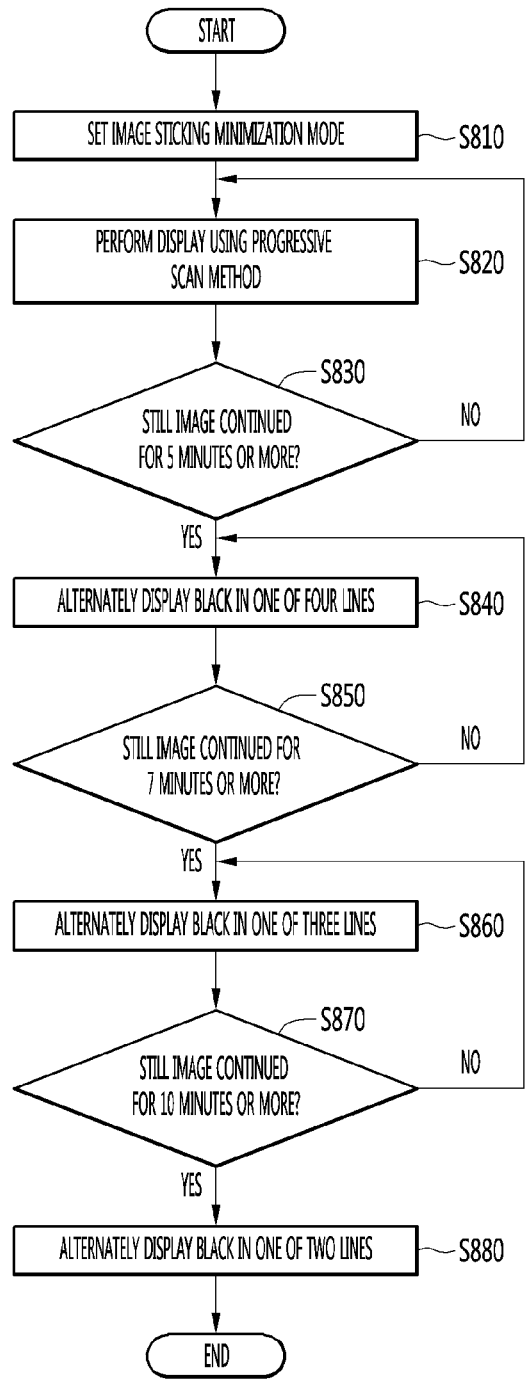
Figure 9:
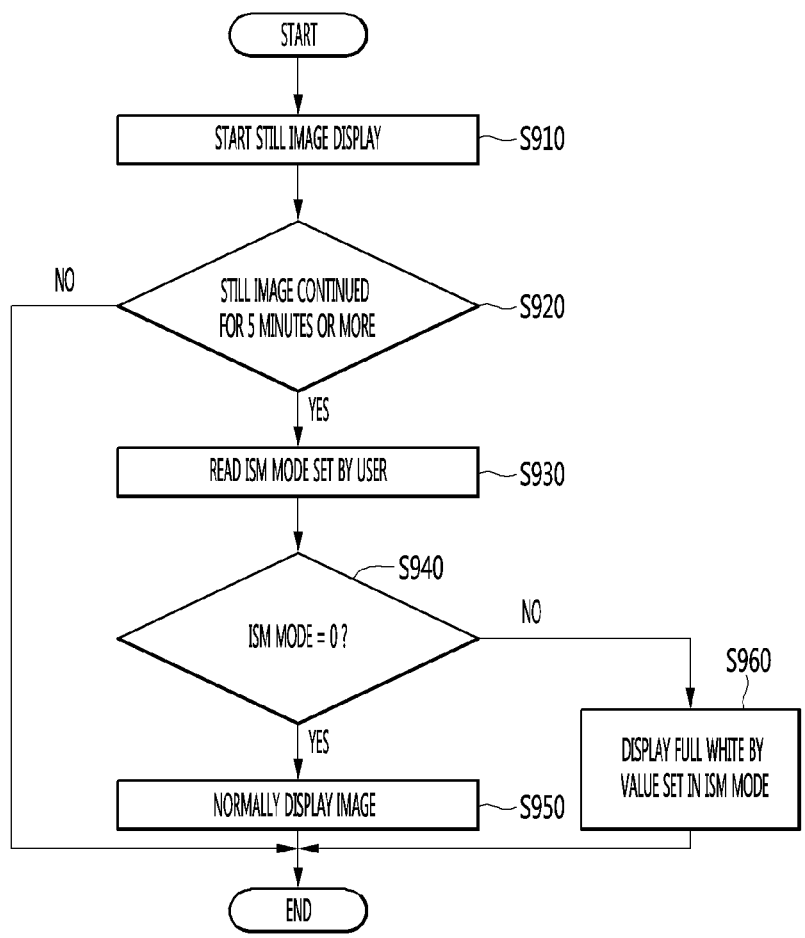

FIGS. 7 to 9 are flowcharts illustrating a control method for minimizing image sticking in a digital signage according to another embodiment of the present invention.

Referring to FIG. 7, a still frame detector is further provided between an ADC and a scaler. When two frames consecutively output from the ADC are the same, the still frame detector may transmit a detection signal indicating that the two consecutive frames are the same to a microcomputer (S720). When the detection signal indicating that the two consecutive frames are the same is received, the microcomputer may check a time when the same image continues using an internal time counter (S730). Next, when the time when the same image continues is equal to or greater than a certain time, the microcomputer sets an "image sticking minimization mode" (S740). Meanwhile, the microcomputer releases the "image sticking minimization mode" when the detection signal indicating that the two consecutive frames are the same is not received from the still frame detector.

As described above, when the "image sticking minimization mode" is set by the microcomputer, a certain number of lines of one frame displays a normal image signal and a next line displays a white or black image signal, thereby minimizing image sticking. In addition, as the time when the still image continues increases, the number of lines for displaying the normal image signal are adjusted, thereby further enhancing the image sticking minimization effect. In addition, a line for displaying a white or black image signal in the current frame displays a normal image signal in a next frame, thereby efficiently minimizing image sticking while preventing a viewer from detecting image change.

Next, when a time when the still image continues exceeds 5 minutes (S830), one of four lines in one frame displays a black image signal (S840). Lines 1, 5, 9 and 13 of a first frame display a black image signal and the other lines display a normal image signal. In order to enable the lines for displaying the black image signal in the first frame to display the normal image signal in the second frame, lines 2, 6, 10 and 14 of the second frame display the black image signal and the other lines display the normal image signal. Display is performed in this manner in third and fourth frames, and, from a fifth frame, display is repeatedly performed using the same method as the first frame.

Meanwhile, when the time when the still image continues is equal to or greater than 7 minutes (S850), one of three lines displays the black image signal (S860). Lines 1, 4, 7 and 10 of the first frame display the black image signal and the other lines display the normal image signal. In order to enable the lines for displaying the black image signal in the first frame to display the normal image signal in a second frame, lines 2, 5, 8 and 11 of the second frame display the black image signal and the other lines display the normal image signal. Display is performed in this manner in third frame, and, from a fourth frame, display is repeatedly performed using the same method as the first frame.

Meanwhile, when the time when the still image continues is equal to or greater than 10 minutes (S870), one of two lines displays the black image signal (S880). Lines 1, 3, 5 and 7 of the first frame display the black image signal and the other lines display the normal image signal. In order to enable the lines for displaying the black image signal in the first frame to display the normal image signal in a second frame, lines 2, 4, 6 and 8 of the second frame display the black image signal and the other lines display the normal image signal. From the third frame, display is repeatedly performed using the same method as the first frame. In the present embodiment, as shown in FIG. 9, the user inputs the frequency of frames for displaying a full-white or full-black image for a predetermined time interval, e.g., 1 second, when a still image continues for a certain time or more through an input menu screen for setting the frequency of frames in an image sticking minimization (ISM) mode. At this time, the frequency of frames of the image sticking minimization mode is set to "0" by default and the user may set a desired frequency of frames. Accordingly, unless the user separately inputs the desired frequency of the user, the frequency of frames in the image sticking minimization mode is set to "0" and normal operation is performed even in the image sticking minimization mode.

Next, the microcomputer of the image display device sets the image sticking minimization mode and a predetermined frequency of frames (S930), when the image input to the image display device is a still image and the still image continues for a certain time or more. During a predetermined time interval, a full-white or full-black screen is displayed by the read frequency of frames (S960). That is, if it is assumed that m frames are displayed for 1 second and the user sets the image sticking minimization mode to n, the number of frames for displaying the full-white image for 1 second is n. At this time, the full-white image is displayed at an interval of m×n frames. For example, when m is set to 60 and n is set to 2, one of 30 frames displays the full-white image. Meanwhile, when a moving image input to the image display apparatus is detected, the microcomputer releases the image sticking minimization mode and normally displays the input image signal.

Figure 10:
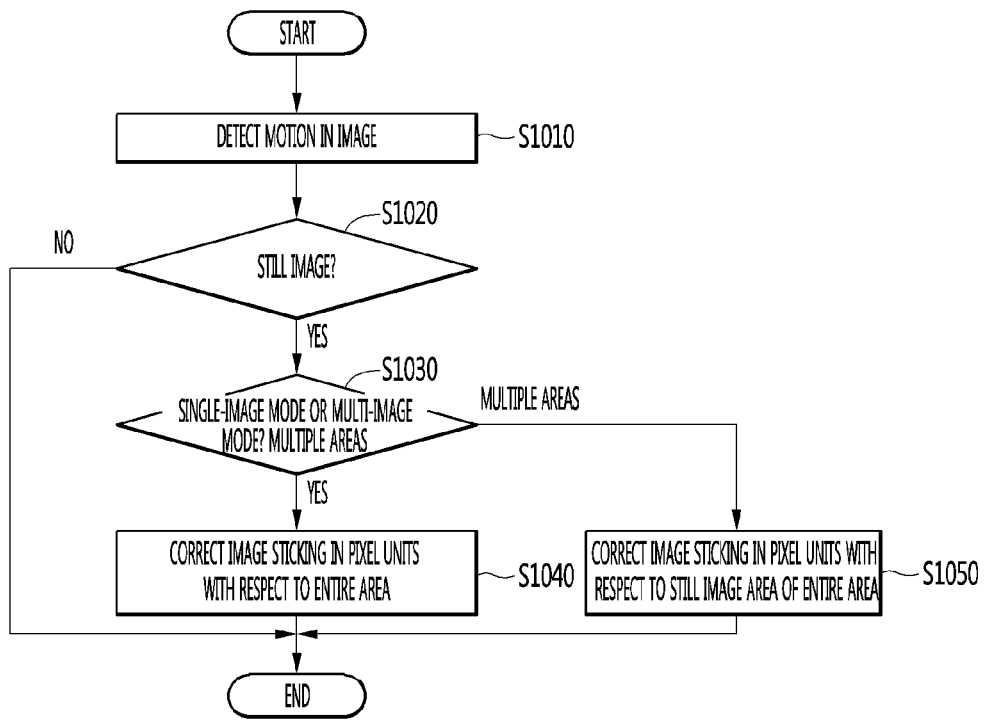
FIG. 10 is a flowchart illustrating an image sticking minimization method of a digital signage having an image sticking minimization function according to the present invention.
Figure 11:
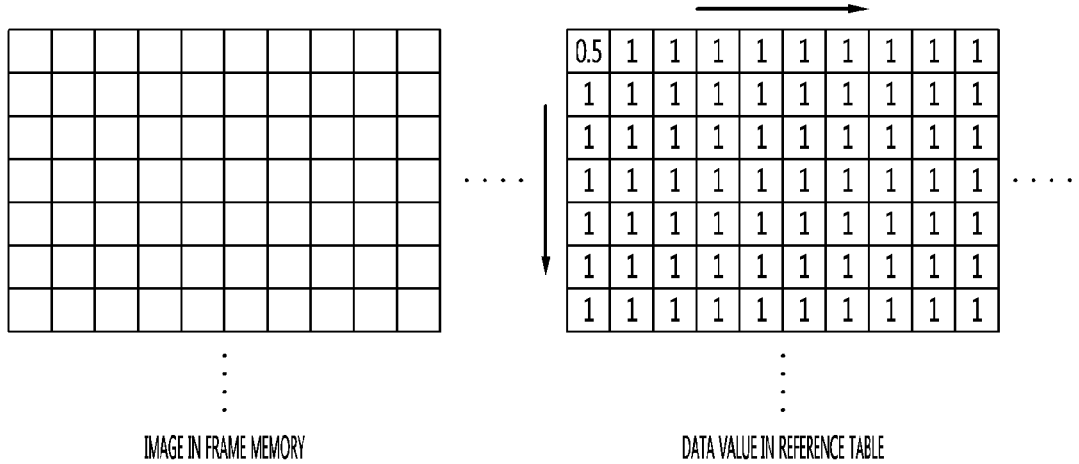
Figure 13:
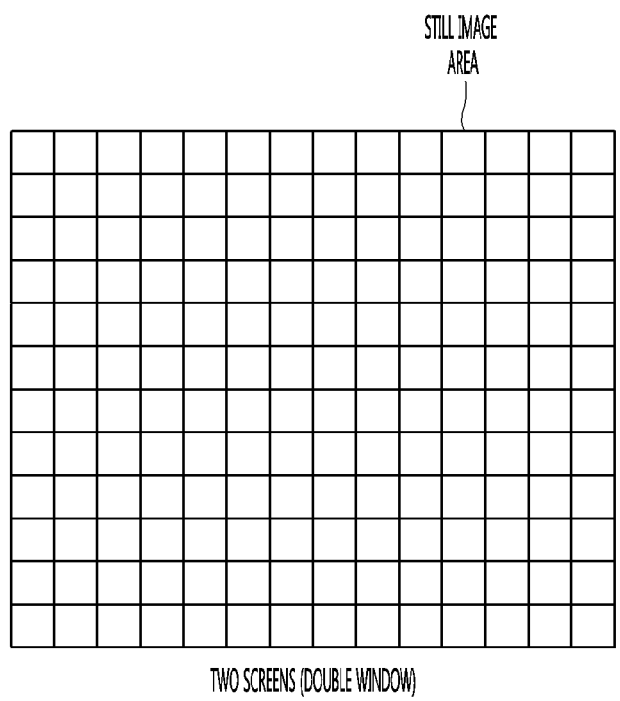

FIG. 10 is a flowchart illustrating an image sticking minimization method of a digital signage having an image sticking minimization function according to the present invention, and FIGS. 11 to 13 are views illustrating an image sticking minimization operation according to an image area.

First, in the digital signage according to one embodiment of the present invention, image data received from the outside is input to a signal processor and an image motion detector through a signal input unit. Subsequently, the signal processor may sample and quantize the received image data during a horizontal period, perform signal processing such that image format conversion is possible and output the processed signal to a scaler. The image motion detector may store the input image data of the frame unit in a frame memory, sum all data values within a window area having a given size based on predetermined coordinates of the stored image data, divide the sum by the window size to obtain an average value, obtain the average value of the image data of a subsequent frame using the same method, compare the average values, compare edge values of the windows when the average values are the same, determine that the input image is a still image when the edge values are the same, and notify the microcomputer that the input image is the still image.

The microcomputer detects image motion according to the output of the image motion detector (S1010) and determine whether the currently input image is a still image (S1020). Upon determining that the currently input image is a still image in step S1020, whether a screen output mode is a single-image mode or a multi-image mode (S1030). That is, whether the screen output mode is a single image mode of a full screen or a multi-image mode such as a picture in picture (PIP) mode or a double window mode may be determined according to user settings. At this time, when the current screen output mode is a PIP mode or a double window mode, one of image inputs is an active area, that is, a moving image, and the other image input is a still image. The microcomputer may know not only the corresponding mode but also in which area the still image is displayed in the PIP mode and the double window mode. Upon determining that the screen output mode is a single-image mode in step S1030, the microcomputer outputs an image sticking correction command to the scaler to perform image sticking correction with respect to the entire area (S1040). A reference table controller of the scaler outputs a reference table value shown in FIG. 11 to a multiplier according to a control signal of the microcomputer and a frame memory controller outputs frame image data from the frame memory to the multiplier under control of the microcomputer. The multiplier multiplies the image data output from the frame memory by a reference table value one-to-one-corresponding to original frame image data, having "0.5" in only one pixel, having "1" in the other pixels, and having a value of "0.5" continuously applied to other pixels with respect to subsequent frames, such that the voltage applied to the pixel is changed, thereby changing the data value in units of one pixel in one frame and minimizing image sticking. This is applied when the still image continues and the image sticking minimization operation may be stopped when the input image is changed to a moving image.

At this time, applying "0.5" in the above-described reference table value is merely an example and all values capable of changing the data level of the original image in pixel units are applicable. Meanwhile, upon determining that the screen output mode is a multi-image mode, that is, a PIP mode or a double window mode, in step S1030, the image sticking correction command is output to the scaler and already known still image area information may be provided as described above such that image sticking correction is performed with respect to the still image area of the entire area (S1050). The reference table controller of the scaler outputs the reference table value shown in FIG. 12 corresponding to the still image area of the PIP screen to the multiplier according to the output of the microcomputer in the PIP mode, and outputs the reference table value shown in FIG. 13 corresponding to the still image area of the double window screen to the multiplier according to the output of the microcomputer in the double window mode. At the same time, the frame memory controller may output the image data of the frame from the frame memory to the multiplier under control of the microcomputer.

Accordingly, as shown in FIGS. 12 and 13, the multiplier multiplies the image data output from the frame memory by reference table values one-to-one-corresponding to original frame image data, having "0.5" in only one pixel, having "1" in the other pixels, and having the value of "0.5" continuously changed and applied to adjacent pixels with respect to subsequently frames, such that the voltage of the pixel is changed, thereby changing the data value in units of one pixel only with respect to the still image area in the PIP mode and the double window mode and minimizing image sticking.

Figure 14:
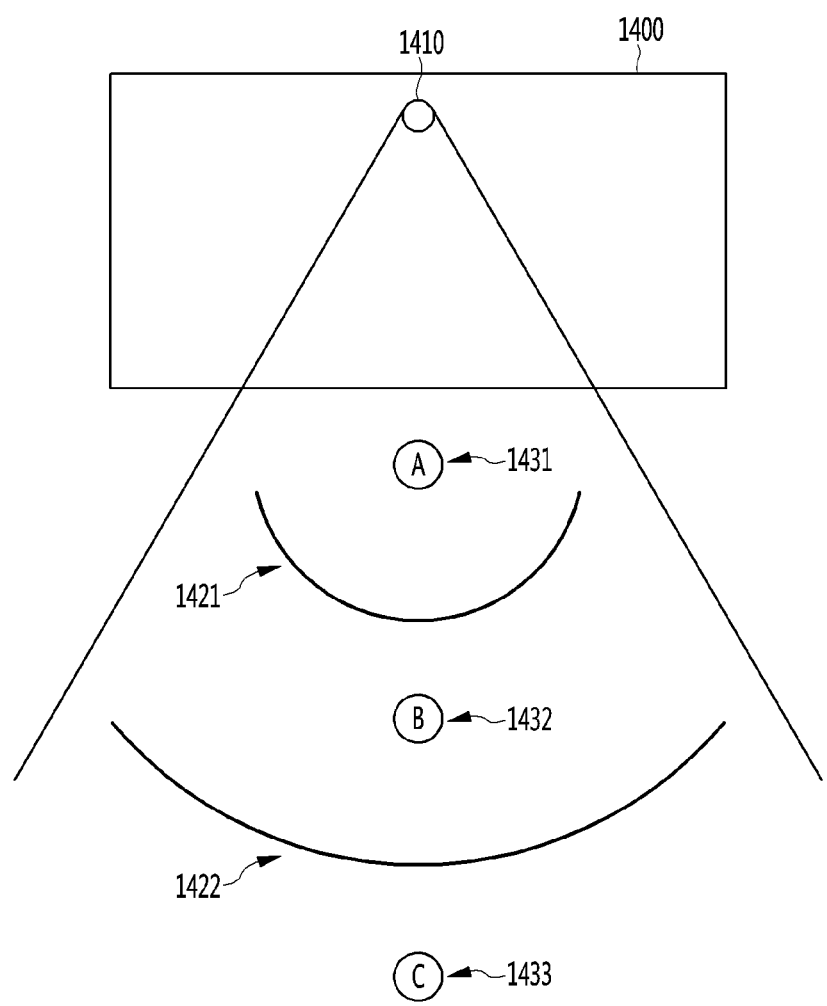
FIG. 14 is a view illustrating a control method for minimizing image sticking in a digital signage according to another embodiment of the present invention.

FIG. 14 is a view illustrating a control method for minimizing image sticking in a digital signage according to another embodiment of the present invention.

As shown in FIG. 14, the digital signage 1400 according to one embodiment of the present invention may include a human body detection sensor unit 1410 at the upper end of the display. The human body detection sensor unit 1410 may include a PIR sensor unit for detecting a human body, an operational amplifier (OpAmp) for amplifying a detected signal and a comparator for comparing amplified signals and outputting a digital value. The digital signage 1400 may detect a human body through the human body detection sensor unit 1410. The digital signage 1400 may apply the image sticking minimization mode step by step according to the position of the human detected through the human body detection sensor 1410. For example, when a human body is located within a first distance 1421 (1431), a first image sticking minimization mode may be performed. In addition, when a human body is located between the first distance 1421 and a second distance 1422 (1432), a second image sticking minimization mode may be performed. In addition, when a human body is located outside the second distance 1422 (1433), a third image sticking minimization mode may be performed. Accordingly, the digital signage 1400 according to one embodiment of the present invention may perform the image sticking minimization mode which varies according to the distance between the human body and the digital signage. This will be described in detail with reference to FIG. 18.

Figure 15:
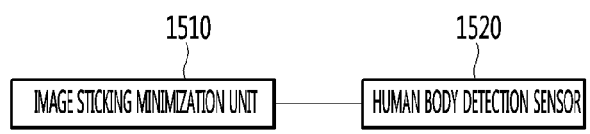
FIGS. 15 to 17 are views schematically showing the configuration modules of a digital signage according to an embodiment of the present invention.
Figure 16:
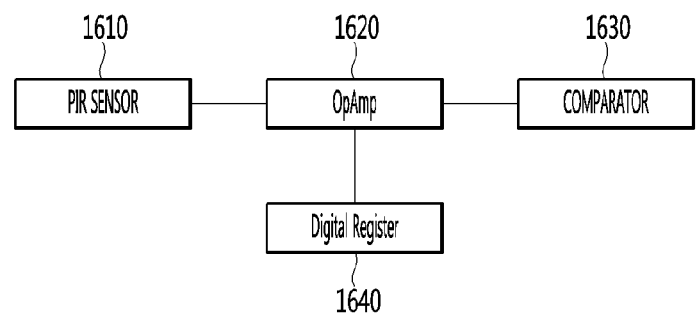
Figure 17:
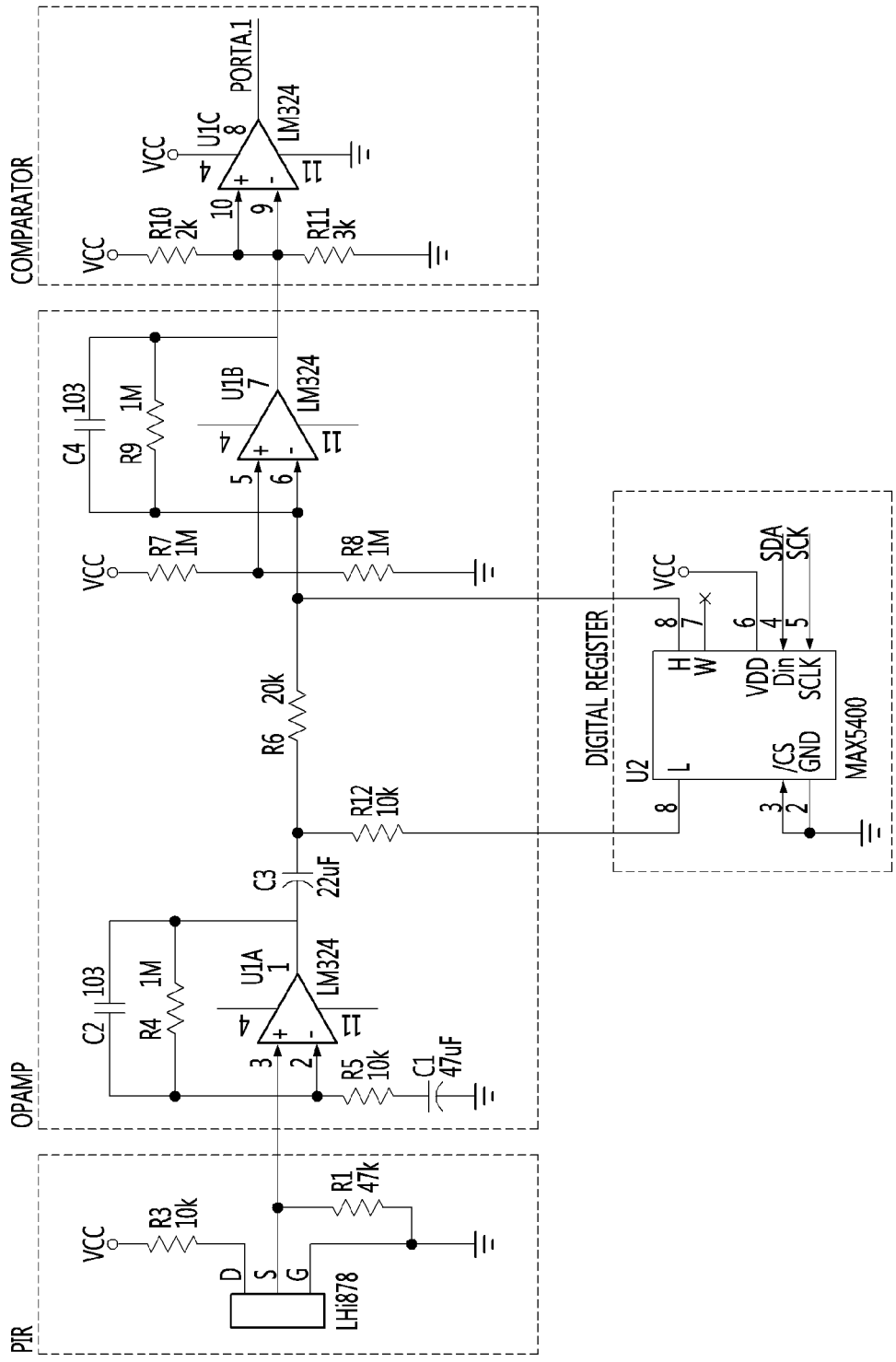

FIGS. 15 to 17 are views schematically showing the configuration modules of a digital signage according to an embodiment of the present invention.

As shown in FIG. 15, the digital signage according to one embodiment of the present invention may include an image sticking minimization unit 1510 and a human body detection sensor unit 1520. In addition, as shown in FIG. 16, the human body detection sensor unit 1520 may include a PIR sensor 1610 for detecting a human body, an OpAmp 1620 for amplifying a detected signal, a comparator 1630 for comparing amplified signals and outputting a digital signal, and a digital register 1640. The detailed circuit diagram of the PIR sensor 1610, the OpAmp 1620, the comparator 1630 and the digital register 1640 shown in FIG. 16 is shown in FIG. 17.

Figure 20:
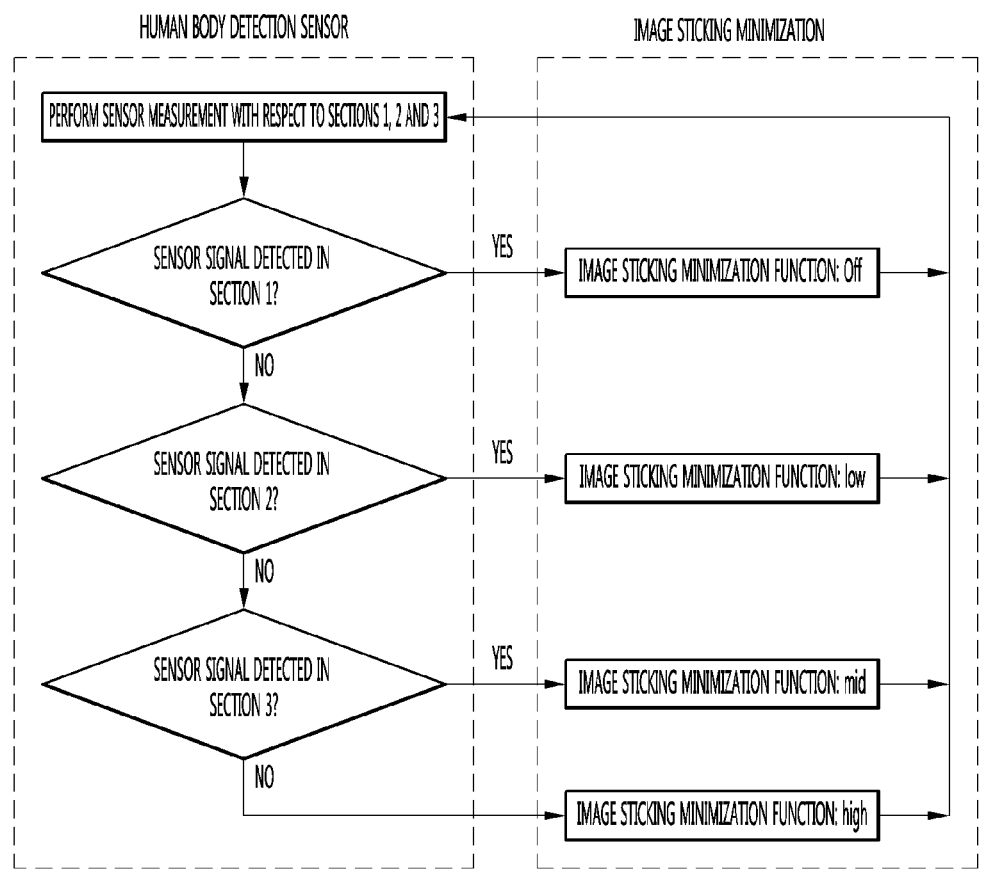

FIGS. 18 to 20 are views illustrating a method of minimizing image sticking in a digital signage according to another embodiment of the present invention in detail.

As shown in FIG. 18, the controller 190 of the digital signage according to one embodiment of the present invention may perform control to divide a frame buffer according to the setting values of the image sticking minimization mode performed step by step (S1810). At this time, the controller 190 may change an arbitrary pixel to black according to the divided sections (S1820). In addition, the controller 190 accumulates and records the locations of the pixels changed to black in a pixel location table (S1830). In addition, different pixels may be selected for each frame, changed to black, and accumulated and recorded in the pixel location table. In addition, the controller 190 may determine whether pixel accumulation recording has been performed with respect to the overall pixel location table (S1840). When accumulation recording has been performed with respect to the overall pixel location table, the controller 190 may initialize the pixel location table (S1850).

For example, when the digital signage performs the first image sticking minimization mode, the controller 190 may determine that a user is located close to the digital signage and divide the frame buffer of the display into a predetermined number or less of divided areas. In contrast, when the digital signage performs the second image sticking minimization mode, the controller 190 may determine that a user is located at a position separated from the digital signage by a predetermined distance or more and divide the frame buffer of the display into a predetermined number or more of divided areas.

In addition, for example, the digital signage according to one embodiment of the present invention may detect a distance between a human body and the digital signage through the human body detection sensor unit. At this time, when the human body detection sensor unit detects that the human body is located in a first section located at a distance closest to the digital signage, the image sticking minimization unit may set the image sticking minimization function to Off in order to maintain the screen resolution quality of the user. In addition, when the human body detection sensor unit detects that the human body is located in a second section located at a certain distance range from the digital signage, the image sticking minimization unit may set the image sticking minimization function to low. When the image sticking minimization function is set to low, the frame may be divided into a predetermined number or less of areas. In addition, the human body detection sensor unit detects that the human body is located in a third section located at a certain distance range from the digital signage, the image sticking minimization unit may set the image sticking minimization function to mid. When the image sticking minimization function is set to mid, the frame may be divided into a predetermined number of areas within a predetermined range. In addition, the human body detection sensor unit detects that the human body is located in a fourth section located outside a certain distance range from the digital signage, the image sticking minimization unit may set the image sticking minimization function to high. When the image sticking minimization function is set to high, the frame may be divided into greater than a predetermined number of areas.

The digital signage and the method of controlling the same according to the present invention are not limited to the configuration and method of the embodiments described above, but all or a part of the above-described elements may be selectively combined such that the embodiments may be variously modified.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications, additions and substitutions should be regarded as being within the scope of the following claims.

The invention claimed is:

1. A digital signage comprising:
a display;
a sensor; and
a controller operably coupled with the display and the sensor,
wherein the sensor detects motion of a human body and a distance between the digital signage and the human body,
wherein the controller divides a frame buffer of content according to a predetermined setting value and causes an arbitrary pixel of divided areas of the frame buffer to change to black,
wherein the predetermined setting value varies according to the distance detected by the sensor such that the predetermined setting value increases as the distance detected by the sensor increases,
wherein the controller performs control to record and store locations of pixels changed to black in the areas of the frame buffer divided according to the predetermined setting value in a pixel location table,
wherein the controller accumulates and records the locations of the pixels changed to black in the pixel location table,
wherein different pixels are selected for each frame, changed to black, and accumulated and recorded in the pixel location table,
wherein the controller selects a target pixel changed to black within the divided areas for each frame of the content until all pixels in the divided areas are changed to black once,
wherein the controller changes the target pixel that is different from the arbitrary pixel that has changed to black to black for each frame,
wherein the controller determines whether pixel accumulation recording has been performed with respect to the overall pixel location table, and
wherein the controller initializes the pixel location table when all pixels in the divided areas are changed to black once and when all the pixels' locations are recorded in the pixel location table such that the pixel accumulation recording has been performed with respect to the overall pixel location table.

2. The digital signage according to claim 1,
wherein the controller performs an image sticking minimization mode varying according to the distance between the digital signage and the human body detected by the sensor, and
wherein the predetermined setting value is determined according to the image sticking minimization mode.

3. The digital signage according to claim 2, wherein, when the distance between the digital signage and the human body is within a predetermined first range,
the controller:
performs a first image sticking minimization mode, and
divides the frame buffer into four areas according to the first image sticking minimization mode.

4. The digital signage according to claim 2, wherein, when the distance between the digital signage and the human body is within a predetermined second range,
the controller:
performs a second image sticking minimization mode, and
divides the frame buffer into nine areas according to the second image sticking minimization mode.

5. The digital signage according to claim 2, wherein, when the distance between the digital signage and the human body is within a predetermined third range,
the controller:
performs a third image sticking minimization mode, and
divides the frame buffer into 16 areas according to the third image sticking minimization mode.

6. The digital signage according to claim 2, wherein, when the distance between the digital signage and the human body is in a predetermined fourth range, the controller sets an image sticking minimization mode to off.

7. The digital signage according to claim 6, wherein the controller sets the image sticking minimization mode to off in response to detection of the human body in a first section, and wherein the controller does not change any pixel to black when the image sticking minimization mode is set to off.

8. The digital signage according to claim 7, wherein the controller:
   sets an image sticking minimization function to low in response to detection of the human body in a second section farther than the first section,
   sets the image sticking minimization function to mid in response to detection of the human body in a third section farther than the second section, and
   sets the image sticking minimization function to high when no human body is detected in the first, second, and third sections.

9. The digital signage according to claim 8, wherein a number of areas of the divided areas of the frame buffer when the image sticking minimization function is set to low is smaller than a number of areas of the divided areas of the frame buffer when the image sticking minimization function is set to mid, and
   wherein the number of areas of the divided areas of the frame buffer when the image sticking minimization function is set to mid is smaller than a number of areas of the divided areas of the frame buffer when the image sticking minimization function is set to high.

10. The digital signage according to claim 1, wherein the sensor includes:
    a PIR sensor configured to detect a human body;
    an operational amplifier (OpAmp) configured to amplify a detected signal; and
    a comparator configured to compare amplified signals and to output a digital value.

11. The digital signage according to claim 10,
    wherein the operational amplifier is controlled by a digital register, and
    wherein the sensor detects the distance between the digital signage and the human body using the digital register.

12. The digital signage according to claim 1, wherein the controller changes a number of divisions of the frame buffer according to the distance between the digital signage and the human body.

* * * * *